Jan. 19, 1965  K. M. TAYLOR  3,166,614
PROCESS OF MAKING NUCLEAR FUEL ELEMENT
Filed Nov. 30, 1959

INVENTOR.
KENNETH M. TAYLOR
BY
ATTORNEY

United States Patent Office

3,166,614
Patented Jan. 19, 1965

3,166,614
PROCESS OF MAKING NUCLEAR FUEL
ELEMENT
Kenneth M. Taylor, Lewiston, N.Y., assignor to The Carborundum Company, Niagara Falls, N.Y., a corporation of Delaware
Filed Nov. 30, 1959, Ser. No. 856,236
4 Claims. (Cl. 264—21)

This invention relates to new articles of manufacture having new characteristics that make these articles particularly adapted for many high temperature applications. More particularly, the invention relates to new nuclear fuel elements.

One object of this invention is to provide a solid fuel element for a nuclear reactor that will incorporate therein, as an integral part thereof, a moderator material.

Another object of the invention is to provide a solid fuel element for a nuclear reactor that has superior ability to retain fission products therein.

Another object of the invention is to provide a solid fuel element for a nuclear reactor, that is particularly adapted for use in a pebble bed type reactor, such as, for example, a reactor of this type that is used to furnish heat to propagate a chemical reaction or a physical change, such as, for example, the gasification of coal. A related object of the invention is to provide a solid fuel element of the character described, that is highly resistant to erosion and corrosion.

Another object of the invention is to provide a solid fuel element for a nuclear reactor of the pebble bed type, that is strong enough to be handled rather freely, and that contains as an integral part thereof, in the proper proportions for use in a reactor, thermal neutron fissionable material and moderator material.

Another object of the invention is to provide a solid fuel element for a nuclear reactor that is characterized by superior resistance to internal stresses and that will not fracture because of internal stresses. A related object of the invention is to provide a fuel element of the character described that will undergo a minimum of dimensional change because of internal stresses.

Another object of the invention is to provide a solid fuel element for a nuclear reactor, that has a substantially impervious outer layer.

A more general object of the invention is to provide refractory bodies of laminar structure that are particularly adapted for a number of specific uses by reason of their novel structure.

Other objects of the invention will be apparent hereinafter from the specification and from the recital of the appended claims.

Figure 1:
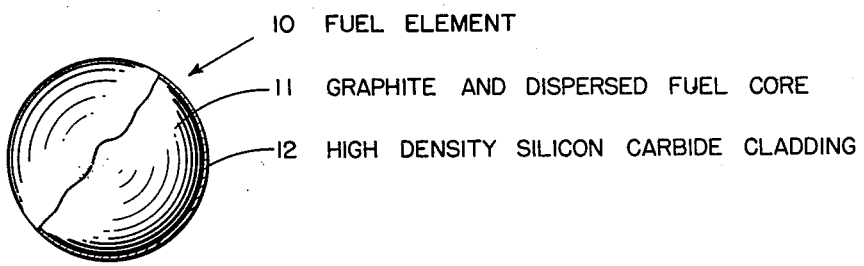
FIG. 1 is a part elevation, part axial section, of a spherical solid fuel element for a nuclear reactor, constructed in accordance with one embodiment of this invention.

I have found that a solid fuel element for a nuclear reactor, that has superior characteristics, can be obtained by making the element with a core comprising thermal neutron fissionable material, with or without fertile material, that is dispersed in a graphite matrix, with a substantially impervious silicon carbide cladding. This is a preferred embodiment of the invention, and several structural variations thereof are within the contemplation of this invention. A fuel element of this construction is capable of operating at very high temperatures. The graphite functions as a neutron moderator. The silicon carbide cladding protects the graphite from erosion, abrasion, and oxidation, and retains the fission products.

While it is contemplated that solid fuel elements, that are made in accordance with this invention, will be spherical in shape, the solid fuel elements can be made with substantially any desired shape. Spherical fuel elements are well adapted for use in pebble type reactors, since the spherical shape leaves a space between adjacent elements through which gas can pass, and at the same time, presents a minimum amount of surface area that is subjected to erosion and abrasion by the gas.

The core of a solid fuel element, that is constructed in accordance with a preferred embodiment of this invention, may contain, in addition to the fuel, that is, the thermal neutron fissionable material with or without fertile material, a refractory material in particulate form, such as, for example, silicon carbide, zirconium carbide, titanium carbide, beryllium carbide, molybdenum carbide, and, in minor amounts, zirconium silicide or titanium silicide. The presence of particulate refractory materials of this character has a beneficial effect on the thermal expansion characteristics of the fuel element, bringing it closer to that of the cladding, and, in addition, may enhance the strength properties of the core. A carbon-bonded or graphite-bonded core may also contain other moderator material, such as, for example, beryllium carbide.

An alternative core structure, that is also contemplated by this invention, is one in which the core body is reinforced by or bonded by a refractory carbide such as silicon carbide, zirconium carbide, or titanium carbide. Such a core body may contain, either as an enclosure therein or preferably in substantially uniform distribution therethrough, moderator material and thermal neutron fissionable material, with or without fertile material. Although graphite is preferred as the refractory ceramic moderator material in a silicon carbide-bonded core body, particularly because it is normally present in many of the raw batches from which such a core is made, beryllium oxide may also be used as the refractory ceramic moderator material, or mixtures of graphite and beryllium carbide may be used.

The active fuel of the element preferably is a thermal neutron fissionable material or a mixture of such a material with a fertile material. Typical fuels that can be employed include, for example, thermal neutron fissionable materials such as metallic uranium, uranium compounds such as, for example, uranium carbide, uranium oxide, and the like, uranium silicide in all of its forms, uranium-beryllium alloys or compounds, mixtures of the foregoing, and the like; and these materials may be mixed with fertile materials such as, for example, thorium carbide. The fuel may be either natural or enriched.

The fuel may be dispersed in the graphite or other moderator material in the core, or, alternatively, it may be prepared in the form of a granule or pellet that is embedded in the other core materials.

The refractory ceramic coating, that encases the core, preferably is a layer of silicon carbide. Other good cladding materials include zirconium carbide, titanium carbide, mixtures of the aforementioned three carbides, and, as well, siliconized silicon carbide, hexagonal silicon carbide that is bonded by cubic silicon carbide, silicon carbide-bonded graphite, silicon nitride, and silicon nitride-bonded silicon carbide. The cladding should be retentive of fission products and resistant to erosion, abrasion, and chemical attack. For this reason, high density claddings are preferred.

In the case of a core that has a fuel substantially uniformly dispersed throughout a graphite matrix, the fuel particles often reach extremely high temperatures when the fuel element is in use. With some fuels, there is often a tendency for a chemical reaction to occur between the particles of fuel that are located at the outer surface of the core, and the cladding material. To avoid the problems that may arise, should such reactions occur, the cladding can be made from two layers, an inner layer of a refractory material that is inert to the fuel, such as graphite, and an outer layer of any of the refractory ceramic coating materials previously mentioned.

A small amount of a burnable poison, such as boron carbide, may also be incorporated in the fuel element. The presence of such material makes control nearly automatic, because both the fuel and poison are consumed together as the reactor is operated.

Several demonstrations of the invention will now be described, to explain in detail how the invention may be practiced.

*Example 1*

[Core: Fuel Dispersed in a Graphite Matrix. Cladding: Thin Coating of Silicon Carbide]

Uranium carbide, for use as fuel, was prepared by carbon reduction of uranium dioxide at 2400° C. The product is essentially single phase, stoichiometric uranium carbide, having the formula $UC_2$. The uranium carbide was crushed, ground, and screened to produce particles having a size predominantly in the range of 100 microns to 200 microns.

Isotropic graphite, having a thermal expansion characteristc very similar to that of high density silicon carbide, was crushed and ground to obtain the following particle size distribution:

| U.S. Standard Mesh Size: | Wt. percent |
|---|---|
| −14 +24 | 0.2 |
| −24 +42 | 11.2 |
| −42 +74 | 16.0 |
| −74 +109 | 26.9 |
| −109 +150 | 17.8 |
| −150 +200 | 12.7 |
| Finer than 200 | 21.2 |

A mixture was then made of the graphite, the uranium carbide, and binder materials, in the following proportions:

| Ingredients: | Parts |
|---|---|
| Graphite | 323 |
| Uranium carbide | 44.8 |
| Dry powdered phenolic resin | 21 |
| Liquid phenolic resin | 48.5 |

All parts and proportions referred to herein are parts and proportions by weight.

The dry ingredients were blended carefully before adding the liquid resin, and thereafter, the batch was mixed thoroughly for three hours, to insure uniformity of distribution of all ingredients throughout the batch. The batch was then pressed into spherical shapes, by pressing in a conventional mold at 6,000 p.s.i. These shapes were placed in a vacuum oven, and were cured for 24 hours at 80° C., then for another 24 hours at 180° C.

The cured spherical shapes were then heated in a vacuum induction furnace to carbonize the resin, to a maximum temperature of 2100° C. After cooling, the shapes were removed from the furnace.

A slurry was then prepared from the following ingredients:

| Ingredients: | Parts |
|---|---|
| Liquid phenolic resin | 135 |
| Ethyl alcohol | ¹ 115 |
| Silicon carbide: | |
| 1,000 mesh | 100 |
| About 500 mesh | 50 |
| 220 mesh | 100 |
| Fine graphite | 60 |
| Gum tragacanth | 15 |

¹ (cc.).

The slurry was prepared by mixing the ingredients together carefully, to prevent air entrainment.

A small amount of this slurry was rubbed manually into the surfaces of the spherical shapes, to fill the surface pores. The shapes were then dipped into the slurry and were permitted to air dry. After air drying, the contact points on the shapes were patched with the slurry, to form a continuous coating, and the coated shapes were then placed in an oven and cured in an inert atmosphere for 24 hours at 80° C., then for 24 hours at 180° C. Spraying has also been used successfully for applying the slurry.

The coated shapes were then placed in graphite crucibles with a small amount of silicon metal. These spherical shapes each had a diameter of approximately 1½", and the amount of silicon employed for each shape was about 8 grs. Each crucible was then fired in a vacuum furnace to 1900° C., and was held at maximum temperature for about 10 minutes. Cooling to room temperature was accomplished in about 16 hours. Very successful firings have also been made in an inert atmosphere at atmospheric pressure.

The silicon, at high temperatures, reacted with the carbon of the coating and the additional carbon that was formed in the coating upon carbonization of the resin in the slurry. Some of the silicon also penetrated through the coating, to react with the graphite and carbon in the core, including the carbon deposited by carbonization of the resin binder.

The silicon carbide coating, that was formed on the fuel elements, had a thickness of about 0.010". Oxidation tests, and immersion of the spheres in hot liquids, indicated that the silicon carbide coatings were substantially impervious.

The foregoing procedure is a preferred technique for the preparation of solid fuel elements having the fuel dispersed in a graphite matrix in a core that is clad with high density silicon carbide. Many variations in the technique are possible and have been tried with substantially equivalent results. For example, the powdered resin can be omitted from the raw batch, if some other binder, that is carbonizable or completely fugitive, is employed. The core can be fired in substantially any furnace that provides the requisite temperature and an inert atmosphere, such as a vacuum. Pressing can be accomplished in conventional molds, or can be accomplished isostatically.

Moreover, zirconium carbide and titanium carbide, in fine particle sizes, can be substituted for the silicon carbide in the slurry for preparing the cladding, and in such case, zirconium or titanium metal is substituted, respectively, for the silicon metal for reaction with the carbon in the cladding.

Every effort should be made, in producing the thin cladding layer, to produce a carbide layer having as high a density as possible, so that the layer will be free from porosity and hence more impervious, strong, and resistant to chemical attack.

While it is preferred that the fuel material be a solid that is dispersed in the graphite by dry mixing, substantially equivalent results are obtained by forming the spherical shaped from a mixture that contains no fuel, and then impregnating the spherical shape with a solution. For such a purpose, a solution of uranium nitrate, or other similar materials, may be employed. Upon firing, the deposited uranium nitrate can be converted to the oxide or carbide.

FIG. 1 illustrates a fuel element of this type comprising a solid core 11 consisting of fuel particles that are substantially uniformly dispersed in a graphite matrix. The cladding 12 comprises a thin coating of silicon carbide, the thickness of this coating being considerably exaggerated in FIG. 1 for purposes of illustration only.

*Example 2*

[Core: Fuel Dispersed in a Matrix of Graphite That is Reinforced by Silicon Carbide Network. Cladding: Thin Coating of Silicon Carbide]

The procedure described in Example 1 has been varied slightly to produce much stronger cores. In this variation of the foregoing procedure, the raw batch mixture for the cores was prepared as in Example 1, and was pressed into the desired shapes at 3000 p.s.i. instead of at 6000 p.s.i., to produce less compacted, porous shaped for firing. Pressures in the range from 2000 p.s.i. to 4000 p.s.i. have been used successfully for this purpose. The shapes were then fired in a vacuum oven to cure the resin, as before, and then were heated in a vacuum induction furnace in the presence of silicon. The temperature was raised to 2100° C. as before, the effect carbonization of the resin first, then to effect infiltration of the shapes by the silicon. The silicon reacted with the carbon and graphite in the shapes to form silicon carbide in a network formation corresponding to the infiltration paths of the silicon. The cores had considerably increased strength because of the presence of the silicon carbide.

The cladding was applied as in Example 1.

Zirconium or titanium metal can be substituted for the silicon metal, if desired, for infiltration of the core. Similarly, the corresponding carbides can be used for the cladding. Other refractory metals and their carbides can also be used. This technique does not reduce the amount of carbon in the core materially, since the effect is an infiltration of the pores.

*Example 3*

[Core: Fuel Dispersed in a Graphite Matrix. Cladding: Inner Layer, Graphite; Outer Layer, Thin Coating of Silicon Carbide]

A graphite-fuel core was prepared as in Example 1. A mixture was then prepared, that was essentially identical with the core mixture except that it contained no fuel or fertile material. A layer of this mixture was pressed about the core and cured, to form a graphite-clad core. The core diameter was approximately 1½", and the graphite protective layer had a thickness on the order of ⅛".

The graphite-clad core was then coated with a silicon carbide slurry, as in Example 1, and upon firing of the silicon carbide slurry-coated core in the presence of silicon metal, as in Example 1, a high density, substantially impervious silicon carbide cladding, having a thickness of about 0.010", was formed on the graphite layer.

Figure 2:
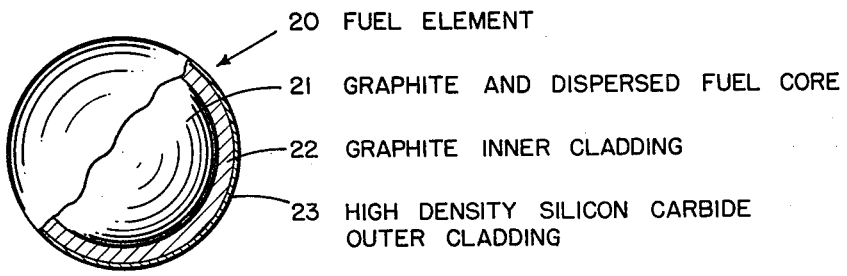
FIG. 2 is a part elevation, part axial section, of a spherical solid fuel element for a nuclear reactor that is constructed in accordance with another embodiment of this invention.

An element of this type is shown in FIG. 2, in which the fuel element 20 has a graphite and fuel core 21, a graphite protective layer 22, and an outer cladding 23 of high density, substantially impervious silicon carbide. In the drawing, the thickness of the cladding 23 of silicon carbide is somewhat exaggerated, for purposes of illustration.

As is Example 1, the cladding may be formed of titanium carbide or of zirconium carbide, by employing these respective particles in the coating slurry, and by firing the coated shape in the presence of the respective metal whose carbide it is desired to form.

*Example 4*

[Core: Solid Granule of Fuel Embedded in a Graphite Jacket. Cladding: Thin Coating of Silicon Carbide]

A granule of fuel was prepared by pressing into a generally spherical shape a quantity of uranium carbide that had been prepared as described in Example 1.

A mixture of graphite and resin was then prepared as was the mixture for the core in Example 1, except that the uranium carbide was omitted from the mixture. This mixture was pressed about the fuel pellet, and cured to make a self-sustaining core. The cladding was then applied as in Example 1.

Figure 3:
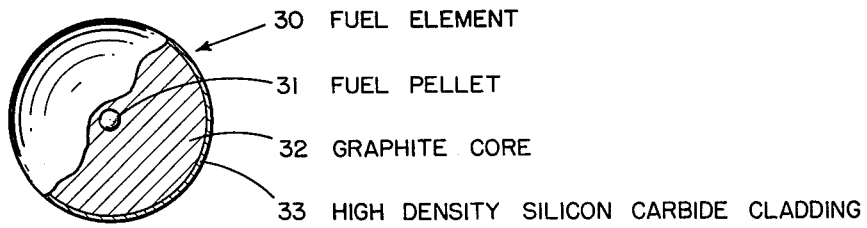
FIG. 3 is a part elevation, part axial section of a spherical solid fuel element for a nuclear reactor that is constructed in accordance with still another embodiment of this invention.

A fuel element of this type is illustrated in FIG. 3. The fuel element 30 comprises a fuel pellet 31 of uranium carbide that is disposed at the center of a spherical core 32 of graphite. The graphite core 32 is clad with a thin layer 33 of silicon carbide.

Considerable variation is possible in the manufacture of fuel elements of this type also. For example, the fuel pellet 31 may contain fertile material in addition to fuel. It may also contain diluent refractory material such as, for example, zirconium carbide.

In a fuel element having a diameter on the order of 1½" to 2", a cladding 33 that has a thickness on the order of about 0.010" or more is quite satisfactory. A cladding made as described, from a thin layer of a refractory carbide, is abrasion resistant, erosion resistant, and is quite inert chemically. Even a thin cladding layer of silicon carbide usually suffices to prevent the escape of fission products from the fuel element, particularly if care is taken in the production of the silicon carbide layer to produce a layer having as high a density as possible. However, additional assurance against the escape of fission products can be obtained by impregnating the graphitic body or layer that underlies the silicon carbide in each case, before applying the cladding, with tar, asphalt, furfural, furfuryl alcohol, or resin and then carbonizing. This process can be repeated until substantially no additional tar, asphalt, or resin, can be forced into the graphitic body or layer, which demonstrates that the graphitic body or layer has been rendered substantially impervious. The application of the cladding over the densified graphite further seals the element against the escape of fission products.

*Example 5*

[Core: Silicon Carbide-Bonded Graphite Containing Dispersed Fuel. Cladding: Thin Layer of Silicon Carbide]

Powdered uranium silicide was mixed with granular graphite, fine powdered graphite, metallic silicon, and phenolic resin. The mixture was pressed into the shape of a rod. This rod was then fired in an atmosphere of carbon monoxide at a temperature at which the silicon reacted with the graphite and with some of the carbon from the atmosphere, to form silicon carbide. The rod produced in this manner was a silicon carbide-bonded rod containing substantially uniformly dispersed therein the powdered uranium oxide and interstitial graphite.

A mixture was then prepared of fine silicon carbide, graphite, a liquid phenolic resin, and a vegetable gum, as in Example 1. This mixture was coated on the outside of the rod. The coated rod was baked to harden the resin, and then fired in the presence of free silicon, to convert the carbon in the coating to silicon carbide.

Fuel elements of this structure have several advantages. The carbon in the core acts as a moderator, yet it is protected from oxidation when the element is used in an oxidizing atmosphere. Moreover, the thermal expansion of the silicon carbide-bonded graphite is very close to that of the cladding, thus minimizing the danger of cracking from internal stresses, caused by heat generated during use of the fuel element in a reactor.

Fuel elements have also been prepared in which a layer of graphite has beeen interposed between the graphite-containing, silicon carbide-bonded core and the high density silicon carbide cladding. In some cases, this additional graphite has been desirable as a moderator, in addition to its function of separating the silicon carbide cladding from the portion of the fuel that is disposed at the surface of the core.

In a further modification of this embodiment of the invention, powdered uranium oxide fuel was pressed into an elongate rod, and the core was then molded about this rod of fuel. The core was formed in the manner described at the beginning of this example for the production of the fuel-containing rod, except that the powdered fuel was omitted from the batch from which the core was prepared. The silicon carbide cladding was then applied as in the second paragraph of this example.

*Example 6*

[Core: Fuel Pellet.—Cladding: Thick Layer of Graphite Bonded by Silicon Carbide]

A fuel pellet was prepared as in Example 4.

To form the protective layer about the fuel pellet, graphite particles, −10 +35 mesh, were mixed with −200 mesh graphite flour, in the ratio of 70 parts by weight of the flour, which were coarser, to 30 parts by weight of the flour, which was very finely divided. The mesh sizes are on the Tyler standard screen scale. A mixture of four parts of a dry powdered phenol-formaldehyde resin and five parts of "Vinsol" resin was thoroughly mixed with the graphite, in an amount of about 20% by weight of the graphite mixture.

These dry ingredients were tumbled to mix them thoroughly, and the mixture was then wetted with about 20% by weight, based on the dry mixture, of pine oil, to dissolve the resin. After screening to break up aggregates, the mix was pressed about the fuel pellet at about 1800 p.s.i., and oven cured at about 150° C. to cure the resin. The hardened shape was impregnated with silicon at 2100° C. to 2200° C., to convert the microcrystalline graphite to silicon carbide, by heating the shape in an induction furnace in an inert atmosphere of argon and in the presence of finely divided silicon metal, −30 +80 mesh.

This fuel element consisted of a small fuel pellet surrounded by a relatively thick refractory cladding consisting essentially of high density silicon carbide having granular graphite inclusions. Only the very fine graphite was converted to silicon carbide during siliconization. The granular graphite inclusions improved the thermal shock resistance of the jacket, and in addition, acted as moderator material.

The graphite inclusions in the cladding exhibited irregular outlines in addition to being sub-rounded or tabular. They ranged in size from 0.12 mm. up to approximately 2.0 mm., and predominantly were in the range 0.73 mm. to 1.81 mm. Some of the inclusions were approximately equi-dimensional.

Where some increase in the amount of moderator material is required, the adjustment can be obtained quite readily by modifying the structure just described, to place a layer of graphite directly around the fuel pellet. Successful fuel elements have been made that have a fuel pellet embedded in a graphite sphere, that is encased in a jacket of silicon carbide-bonded graphite made in accordance with the foregoing technique.

The raw batch mix for the outer jacket may include other materials, where modification of the jacket properties are desired. For example, metallic beryllium functions as a moderator material. Beryllium oxide and beryllium carbide can also be used for the same purpose. Other fine metals, such as, for example, titanium, molybdenum, and chromium can also be incorporated in the raw batch for the jacket.

*Example 7*

[Core: Carbon-Bonded Core Containing Dispersed Fuel and a Compatible Dispersed Refractory Material. Cladding: Inner Layer, Graphite; Outer Layer, Thin Coating of Silicon Carbide]

A solid fuel element was prepared that consisted of a relatively large core that was encased in a relatively thin layer of silicon carbide. The raw batch for the core was made from a mixture of fuel, graphite, granular beryllium carbide, and sufficient liquid and powdered phenolic resin to function as a binder during firing. This mixture was pressed into a spherical shape, and then was encased in a protective layer of a mixture consisting primarily of graphite, as in Example 3. An outer, thin protective layer of silicon carbide was then applied over the inner layer of graphite, as in Example 3.

The beryllium carbide served to modify the thermal expansion characteristics of the core, and also functioned as a moderator. The granular refractory material may also be, for example, titanium carbide, zirconium carbide, and silicon carbide, instead of beryllium carbide, with some loss, however, in the moderator function. If desired, the inner layer of the cladding, which consists essentially of graphite, may be omitted.

*Example 8*

[Core: Uranium-Beryllium Alloy. Cladding: Inner Layer, Graphite; Outer Layer, Thin Coating of Silicon Carbide]

A fuel pellet was formed from a uranium-beryllium alloy having substantially the formula $UBe_{13}$. The pellet was prepared by hot pressing the alloy powder to form a pellet of the desired size. Similar pellets have also been prepared successfully by cold pressing and sintering.

This fuel pellet was encased in a relatively thick protective layer of graphite, as in Example 4. A thin layer of high density silicon carbide was then formed over the graphite inner layer, also as in Example 4.

Successful solid fuel elements have also been manufactured in which the fuel pellets were made from mixtures of beryllium carbide and the fuel, and from mixtures of beryllium oxide and the fuel.

When beryllium is employed in the fuel pellet, either in direct combination with the uranium, or as a beryllium compound that is admixed with uranium or with a uranium compound, the beryllium functions as a moderator material. The graphite layer is valuable as a moderator, and to separate the fuel from the silicon carbide cladding.

*Example 9*

[Core: Zirconium Carbide, Graphite and Dispersed Uranium Carbide. Cladding: Thick Layer of Silicon Carbide]

A raw batch for a core was formed by mixing together fine particles of uranium carbide as the thermal neutron fissionable material, zirconium carbide, graphite and a phenolic resin binder. The zirconium carbide and graphite particles were predominantly below 5 microns in size. The graphite amounted to a major portion of the batch, and the uranium carbide amounted to about 10% by weight of the batch. This mix was cold pressed, then heated in an inert atmosphere at about 2000° C. to form a rigid, self-sustaining body.

The cladding mixture comprised fine granular silicon carbide and a carbonizable resin binder. This was applied about the core as a layer of substantially uniform thickness. The coated core was then fired to carbonize the resin and to recrystallize the silicon carbide, to form a silicon carbide cladding about the core. The cladding made in this manner had a porosity on the order of about 25% by volume.

The porous silicon carbide cladding was then impregnated with a solution of a phenol formaldehyde resin in a predetermined amount. The clad core was then fired to carbonize the resin deposit in the pores of the cladding an amount of carbon equal to 85% to 95% by weight of that required, theoretically, to react with silicon completely to fill the pores of the cladding. In some cases, more than one impregnation with the resin or other carbonizable material was necessary, to deposit the proper amount of carbon in the pores.

When the proper amount of carbon had been deposited in the pores, the element was siliconized to convert the carbon in situ to silicon carbide, and to form a layer of high density silicon carbide about the core. Examination of the cladding revealed that it had a density on the order of 3.15 gr./cm.$^3$.

Good results were also obtained when, in the manufacture of the core, beryllium compounds were substituted for part or all of the graphite. In a similar manner, titanium carbide and silicon carbide have been substituted for the zirconium carbide as refractory diluents in the core, with satisfactory results.

The foregoing technique is of considerable value for forming dense carbide claddings. This technique involves forming a porous skeleton of a refractory carbide by sintering or other suitable means, depositing a calculated amount of carbon in the pores of the carbide skeleton, then heating with a suitable metal to impregnate the skeleton and to convert, at least partially, the impregnating metal and the interstitial carbon to carbide in situ.

A variation of this technique involves forming, by pressing, casting, ramming or the like, a mixture consisting of refractory carbide powder or granules, carbon, and/or carbonizable bonding material such as a liquid phenolic resin, drying and curing, carbonizing, and then heating with a suitable metal to convert, at least partially, the carbon in the formed body to the metal carbide in situ. This technique is readily applicable to the formation of highly dense carbides of silicon, zirconium, and titanium.

Optimum results frequently are obtained when the amount of carbon in the pores is 90% of the amount that is required, theoretically, to react with the metal completely to fill the pores with carbide. Excellent results are generally obtained when the amount of carbon present is 85% to 95% of this theoretical amount, although more or less carbon can be employed, with good results. If a mixture of metals is employed to react with the interstitial carbon, or if two different metals are used sequentially, each in less than the entire amount required to react completely with the carbon, then a composite body is obtained. For example, a composite body of zirconium carbide and titanium carbide may be produced in this manner.

Good claddings may also be formed by infiltrating a skeletal structure of one metal carbide with interstitial carbide of another metal. For example, a zirconium carbide skeleton may be rendered dense and impervious by the formation of interstitial silicon carbide. Usually, cladding of this type contains a minor amount of zirconium silicide. Similarly, when a titanium carbide skeleton is infiltrated and densified with silicon carbide, the dense body is found to contain minor amounts of titanium silicide.

The conversion of the carbon to carbide, by metal impregnation, requires an elevated temperature that is, however, below the decomposition temperature of the carbide. For example, siliconization to produce silicon carbide preferably is accomplished at 2000° C. to 2150° C., but higher temperatures, that are below the decomposition temperature of silicon carbide, and lower temperatures, that are above about 1700° C., may be employed. Usually, it is preferred that the temperature be high enough, for a sufficient length of time, that the silicon carbide that is formed be converted to the hexagonal crystal form.

The foregoing generalizations are applicable to the formation of dense carbide coatings for all of the fuel element structures described herein.

*Example 10*

[Core: Graphite, Zirconium Carbide and Dispersed Uranium Carbide. Cladding: Thin Layer of Silicon Carbide]

A mixture was made of uranium carbide, graphite, a relatively small portion of zirconium carbide, and a thermosetting epoxy resin. This mixture was shaped to form the core of a fuel element, and the resin was cured to harden the resin to make the shape self-sustaining.

This core shape was then coated with a silicon carbide containing slurry, as in Example 1, and the coated core shape was fired in the presence of silicon, first to carbonize the resin, then to cause the silicon to react with the carbon in the core and in the coating about the core. The thin layer of silicon carbide had the same valuable and desirable characteristics as those produced in Example 1.

This fuel element had a core composed of fuel material, zirconium carbide, and a mixture of carbon and graphite, together with some silicon carbide that was formed in situ by infiltration of the silicon, and some peripheral silicon carbide. The thin silicon carbide cladding layer was integral with the core. During siliconization, the silicon penetrated the core to a limited extent, to convert some of the carbon in the core to silicon carbide. The cladding itself consisted essentially of silicon carbide having a density on the order of about 3.12 gr./cm.$^3$.

The advantage of a fuel element of this type is that the more refractory zirconium carbide is adjacent the fuel, where temperatures are highest during use of the element in a reactor, and the more chemically inert silicon carbide is at the outside surface of the element, where it can protect the element against chemical attack.

*Example 11*

[Core: Fuel and Granular Silicon Carbide Dispersed in a Carbon-Bonded Graphite Matrix. Cladding: Thin Protective Layer of Silicon Carbide]

A mixture was prepared of the following, in parts by weight:

| | |
|---|---|
| Finely divided SiC | 20 |
| Granular Graphite, —24 mesh | 50 |
| Pitch | 15 |
| Tar | 10 |
| Fuel | 5 |

This mixture was molded and then carbonized to form a bonded article. The bonded article was heated in the presence of silicon to form a thin protective layer of silicon carbide at the surface of the article.

*Example 12*

[Core: Graphite Containing Dispersed Zirconium Carbide Granules and Fuel. Cladding: Zirconium Carbide]

A spherical core was made by pressing a mixture of finely divided graphite, about 25% by weight of said graphite of finely divided zirconium carbide, and about 10% by weight of said graphite of enriched uranium carbide, and a carbonizable resin binder.

A slurry was then made by mixing zirconium carbide powder, powdered carbon, and an alcohol solution of a carbonizable resin. The core was then coated with this slurry, and the coated core was oven cured to dry it and to harden the resin.

A second slurry was then prepared by mixing zirconium hydride with a small amount of the alcohol solution of the carbonizable resin. The second slurry was then applied over the initial coating on the core, and cured to harden the resin. The coated piece was then fired in an inert atmosphere to a temperature sufficient first to carbonize the resin the piece, then to cause dissociation of the zirconium hydride, to release metallic zirconium. The zirconium reacted with the powdered carbon in the first coating and with the carbon that had been formed adjacent the surface of the core. In this way, the coating and the core were densified and unified.

Instead of zirconium hydride, powdered metallic zirconium, or some other zirconium compound that decomposes upon firing, to release metallic zirconium, can be used. During firing, instead of an inert atmosphere, a reducing atmosphere, or a high vacuum, can be employed. Likewise, silicon nitride can be decomposed to provide a source of silicon, with some advantages in making shaped bodies because of the high decomposition temperature of the silicon nitride.

These techniques have general applicability to the formation of coatings of the carbides of titanium, zirconium, and silicon. Moreover, the coating materials may be selected to give composite coatings such as mixed carbides and solid solutions of carbides.

A generally similar technique has been employed successfully to form a graphite core clad with a layer of high density titanium carbide.

The graphite that is employed, together with the fuel, to form a graphite-bonded core, in accordance with this invention, should be selected so that the coefficient of expansion of the core is approximately the same as that of the protective cladding. In some cases, therefore, the graphite selected will have a lower thermal expansion coefficient than silicon carbide, for example, because some fuel materials, such as uranium carbide, have a higher thermal expansion coefficient than silicon carbide, and it is desirable to have the coefficient of the composite core match that of the cladding.

Graphite is a preferred refractory ceramic moderator material. Other moderators that are satisfactory are beryllium and many of its compounds. Mixtures of graphite and beryllium carbide are satisfactory moderators. Granular carbides are used in the core to adjust the thermal expansion characteristics of the core and the refractory properties of the core.

The protective cladding for the fuel element may be a self-bonded metal carbide of silicon, titanium, or zirconium, or one of these carbides that is bonded by its respective metal, or by one of the other metals. It may also be a nitride, such as, for example, nitrided silicon; or it may be silicon carbide that is bonded by nitrided silicon. The cladding may also include refractory metal compounds such as oxides that are dispersed in and bonded by a material such as, for example, silicon carbide or nitrided silicon. When silicon carbide is employed as a cladding material, it may be self-bonded by the same or a different crystal form; that is, for example, the cladding may be hexagonal silicon carbide that is bonded by cubic silicon carbide.

It is to be understood that when the expression "silicon carbide, titanium carbide, zirconium carbide, mixtures thereof, and nitrided silicon" is used, this expression refers to, and is intended to encompass, for example, not only silicon carbide per se, but also siliconized silicon carbide, silicon carbide bonded by nitrided silicon, silicon carbide-bonded refractories such as, for example, graphite, and silicon carbide that consists of one crystal form of silicon carbide bonded by a second crystalline form of silicon carbide, and also, titanium-bonded carbide, zirconium-bonded carbide, carbide mixtures and solutions that are self-bonded, metal-bonded, and bonded by other carbides of this group, and the like.

Moreover, the words "core" and "cladding" as used herein must be interpreted rather freely, since when a graphite layer is interposed between the fuel containing portion of the element and the impervious jacket, the graphite layer obviously can be considered either as part of the core or as part of the cladding. In the preceding description, such a graphite layer has been considered as a part of the cladding in most cases, for consistency, but the claims should not be limited to this interpretation.

While the invention has been described in connection with several specific embodiments thereof, it will be understood that it is capable of further modification, and that this application is intended to cover any variations, uses, or adaptations of the invention following, in general, the principles of the invention and including such departures from the present disclosure as come within known or customary practice in the art to which the invention pertains and as may be applied to the essential feature hereinbefore set forth, and as fall within the scope of the invention or the limits of the appended claims.

I claim:

1. In a process for making a solid spherical nuclear fuel element particularly adapted for use in a pebble bed type reactor and comprising an internal core, and an integral and substantially impervious, external refractory metal carbide cladding encasing said core, the steps including forming said core to include thermal neutron fissionable material, forming said cladding by coating said core with a porous outer layer deposited from a slurry consisting essentially of at least one refractory metal carbide selected from the group consisting of silicon carbide, zirconium carbide and titanium carbide and carbonaceous material, rendering said layer substantially impervious by heating to cause a reaction between said carbonaceous material and at least one metal selected from the group consisting of silicon, zirconium and titanium in an environment supplying said metal and thereby form additional refractory metal carbide selected from said group, and forming one of said core and cladding to include within said layer refractory ceramic neutron moderator material selected from the group consisting of carbon, beryllium, beryllium oxide, beryllium carbide, and mixtures of carbon and beryllium carbide.

2. In a process as in claim 1, forming said core to include said moderator material.

3. In a process as in claim 2, forming said core also to include beneath said layer at least one refractory metal carbide selected from the group consisting of silicon carbide, zirconium carbide and titanium carbide.

4. In a process as in claim 2, forming said cladding also to include an inner layer by first coating said core with said moderator material, prior to said coating with said porous outer layer.

References Cited in the file of this patent

UNITED STATES PATENTS

| 2,727,996 | Rockwell et al. | Dec. 20, 1955 |
| 2,814,857 | Duckworth | Dec. 3, 1957 |
| 2,816,042 | Hamilton | Dec. 10, 1957 |
| 2,818,605 | Miller | Jan. 7, 1958 |
| 2,843,539 | Bornstein | July 15, 1958 |
| 2,848,352 | Noland et al. | Aug. 19, 1958 |
| 2,897,572 | Hansen | Aug. 5, 1959 |
| 2,907,705 | Blainey | Oct. 6, 1959 |
| 2,910,379 | Gurinsky | Oct. 27, 1959 |
| 2,910,416 | Daniels | Oct. 27, 1959 |
| 2,920,025 | Anderson | Jan. 5, 1960 |
| 2,930,015 | Blumer | Mar. 22, 1960 |
| 2,950,238 | Nicholson | Aug. 23, 1960 |
| 2,990,351 | Sanz et al. | June 27, 1961 |
| 2,992,127 | Jones | July 11, 1961 |

FOREIGN PATENTS

| 754,559 | Great Britain | Aug. 8, 1956 |
| 788,284 | Great Britain | Dec. 23, 1957 |
| 1,055,704 | Germany | Apr. 23, 1959 |

OTHER REFERENCES

AEC Document TID-7530 (Pt. 1), April 1951, pages 2-3.

AEC Document ORNL-2614, pages 130-132, November 20, 1958.

AEC Document TID-10001, October 19, 1954, in particular page 33.

Nucleonics, March 1956, pages 34-44.

Nuclear Fuels by Gwinskey et al.: D. Van Nostrand Co., 1956, pages 253 and 350.